No. 802,261. PATENTED OCT. 17, 1905.
J. A. BOUCHILLON.
SEED PLANTER AND FERTILIZER DISTRIBUTER.
APPLICATION FILED FEB. 2, 1905.

2 SHEETS—SHEET 1.

WITNESSES:

INVENTOR
John A. Bouchillon
BY Munn & Co.
ATTORNEYS

No. 802,261. PATENTED OCT. 17, 1905.
J. A. BOUCHILLON.
SEED PLANTER AND FERTILIZER DISTRIBUTER.
APPLICATION FILED FEB. 2, 1905.
2 SHEETS—SHEET 2.
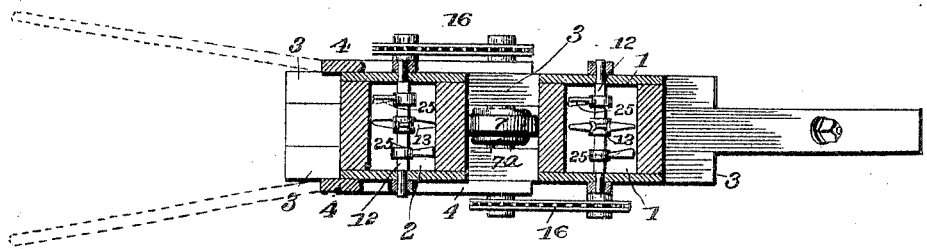
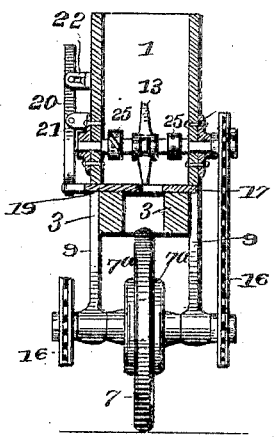
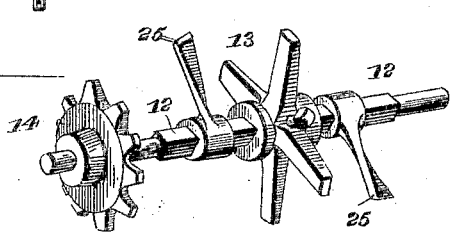
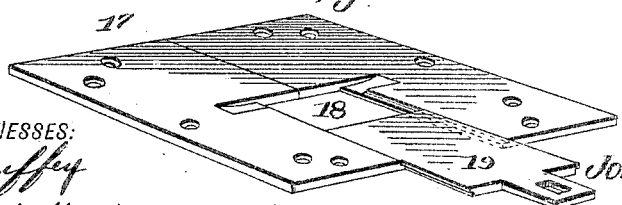
WITNESSES:
C. C. Duffey
Amos W. Hart
INVENTOR
John A. Bouchillon
BY Munn & Co.
ATTORNEYS

UNITED STATES PATENT OFFICE.

JOHN A. BOUCHILLON, OF PELZER, SOUTH CAROLINA, ASSIGNOR OF ONE-HALF TO CHRISTOPHER C. HINDMAN AND HERBERT P. BEAM, OF PELZER, SOUTH CAROLINA.

SEED-PLANTER AND FERTILIZER-DISTRIBUTER.

No. 802,261.  Specification of Letters Patent.  Patented Oct. 17, 1905.

Application filed February 2, 1905. Serial No. 243,860.

*To all whom it may concern:*

Be it known that I, JOHN A. BOUCHILLON, a citizen of the United States, and a resident of Pelzer, in the county of Anderson and State of South Carolina, have invented an Improved Seed-Planter and Fertilizer-Distributer, of which the following is a specification.

My improved seed-planter and fertilizer-distributer is of that class in which separate hoppers are employed, each being provided with means for agitating its contents and feeding the same to discharge-orifices, the machine being supported upon a bearing-wheel from which the agitators are operated.

The details of construction, arrangement, and combination of parts are as hereinafter described, reference being had to the accompanying drawings, in which—

Figure 1:
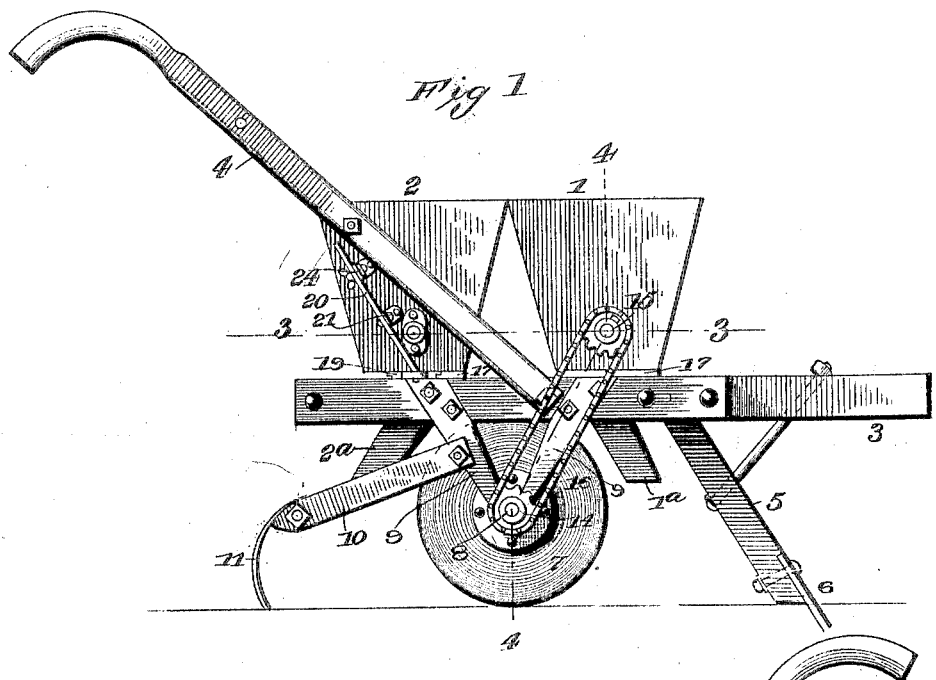
Figure 2:
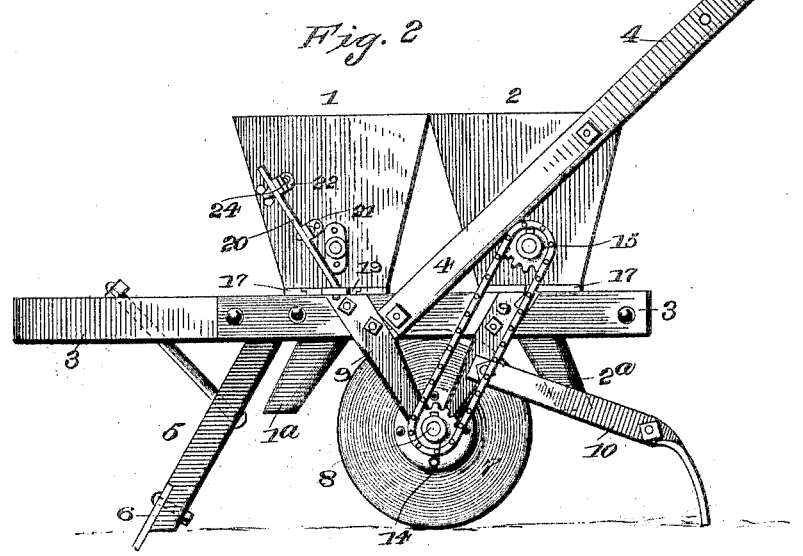

Figures 1 and 2 are elevations of opposite sides of the machine. Fig. 3 is a horizontal section on the line 3 3 of Fig. 1. Fig. 4 is a vertical section on the line 4 4 of Fig. 1. Fig. 5 is a perspective view illustrating the means for regulating the size of the discharge-orifice of the respective hoppers. Fig. 6 is a perspective view of the means provided in each hopper for agitating its contents and feeding the same to the discharge-orifice; and Fig. 7 is a perspective view of the bottom or base portion of each hopper, together with the adjustable devices for regulating the size of the discharge-orifice therein.

A fertilizer-hopper 1 and seed-hopper 2 are arranged one in front of the other upon a suitable horizontal frame 3, which is provided with handles 4 and a front standard or stock 5, carrying a furrow-opener 6, as usual in this class of machines. In the center of said frame 3, below the same and equidistant from the hoppers 1 2, is arranged a supporting and transporting wheel 7, whose shaft or axle 8 has its bearings in the lower ends of opposite pendent V-shaped hangers 9, whose ends are bolted to the sides of the frame 3. The V-shaped hangers are parallel, and by their form and arrangement they form a support or bearing for the wheel 7, which combines maximum strength, lightness, and cheapness. In rear of said wheel 7 are arranged furrow-closers or seed-coverers 10, the same consisting of bars which are pivoted to the V-shaped hangers 9 and provided with curved metal blades 11. These devices operate by gravity, which is sufficient to force them into the soil to an ordinarily-required depth; but additional weight may be attached to them when required. It will be seen that the seed-coverer swings entirely free or independent of the other portions of the machine and that it operates the same at whatever depth the furrow-opener runs, and also whether the operator bears down upon or lifts up on the handles 4.

In each of the hoppers 1 2 is arranged a transverse shaft 12, (see Fig. 6,) the same being located in the lower central portion of the hopper and journaled in bearings attached to the sides thereof. On each of these shafts 12 is mounted a device 13 for agitating the contents of the hopper, the same consisting of a star-shaped wheel which is clamped upon the polygonal portion of the shaft 12, and therefore rotates therewith. Means are provided for imparting rotation to each shaft 12 from the axle 8 of the transporting-wheel 7, such means being arranged on the respective hoppers on opposite sides of the machine, as will be understood by reference to Figs. 1, 2, and 3—that is to say, a sprocket-wheel 14 is mounted on each end of the wheel-axle 8 and a corresponding sprocket-wheel 15 is applied to the opposite ends of each of the two hopper-shafts 12. Chains 16 run on the two pairs of sprocket-wheels thus provided, so that rotation is imparted at equal speed from the opposite ends of the wheel-axle 8 to the respective hopper-axles and agitators mounted thereon. The bottom or base portion of each hopper is formed as shown in Fig. 7. It consists of two L-shaped plates 17, which are so arranged that their wider ends abut, while a space 18 is left between their narrower portions, which in practice serves as an orifice or discharge for the contents of the hoppers through their respective spouts 1ᵃ and 2ᵃ. The proportion and arrangement of parts are such that the agitators 13 are located directly over the inner end of the orifice 18, the side edges of the plates 17 being cut out or notched at that point to provide due space for the teeth of the agitator.

The device for enlarging or contracting the size of the discharge-orifice 18 is a rectangular slide 19, the same having rabbeted edges fitted upon corresponding edges of the pieces 17, so that the slide 19 is duly supported in any adjustment thereof and is yet adapted for detachment when required.

The means for adjusting the slide 19 and also for holding it locked in any position to which it may be adjusted is a bar 20, (see Figs. 1, 2, 4, and 5,) the same being pivoted at its middle to a bracket 21, that is secured to the side of a hopper, and one end loosely engaging the outer end of the slide, while the other is adjustably connected with another bracket 22, that is similarly secured to the hopper and provided with a slot 23, that receives a clamping-bolt 24, passing through the bar 20. It is apparent that the said bar operates as a lever swinging on the fulcrum 21 and that by pushing this upper end inward or pulling it outward the slide will be adjusted in the reverse direction correspondingly, while the clamp 24 serves to hold the parts in any desired position. As shown, this means for adjusting a cut-off or slide 19 is applied to the respective hoppers on opposite sides, as is practically necessitated by the opposite arrangement of sprocket-gearing before described.

For the purpose of feeding the material in the respective hoppers toward the discharge-orifice 18 in the bottom thereof I employ arms 25, (see Figs. 3 and 6,) which are applied to the shaft 12 on opposite sides of the agitator 13 and project in opposite directions from the shaft, the same being formed as flat blades, which are twisted a quarter-round, so that they act upon the material in the hopper.

The inclination of the outer ends of the arms 25 is such with reference to their rotation as to cause the material to feed from opposite sides of the agitator toward the same, so that it is acted upon by the arms of the agitator and broken up or pulverized to a greater degree, as well as moved toward the discharge-orifice, thus insuring a more uniform feed than would be otherwise practicable.

The bearing-wheel proper, 7, is clamped between two disks 7ª, which are provided on their outer sides with central extensions forming hubs adapted to receive and rotate upon the axle 8. Owing to the central arrangement of the wheel 7, before described, it is apparent that the remaining portion of the machine is practically balanced thereon, so that the labor of guiding and supporting the machine vertically is reduced to a minimum.

What I claim is—

1. A hopper provided with a bottom portion formed of L-shaped plates arranged with their broader ends together, a slide supported and adapted for ajustment in the slot formed between the narrower ends of such plates and lying flush therewith, and means for adjusting and locking the slide in the manner described.

2. The combination, with the horizontal frame and two hoppers mounted thereon, of a bearing-wheel arranged below, and two pendent parallel V-shaped hangers 9 having their lower ends provided with bearings for the axle of the said wheel, the hangers being secured detachably to the sides of the frame, substantially as described.

3. The combination, with the horizontal frame, seed-hoppers mounted thereon and V-shaped hangers pendent from the frame and arranged parallel, a bearing-wheel journaled in the apexes of the hangers, and a coverer comprising bars which are pivoted to the rear members of said hangers and curved downward as shown, as and for the purpose specified.

JOHN A. BOUCHILLON.

Witnesses:
W. V. Woodson,
B. C. Babb.